United States Patent
Yamada

(10) Patent No.: US 6,195,597 B1
(45) Date of Patent: Feb. 27, 2001

(54) ONBOARD INFORMATION PROCESSING APPARATUS AND AUTOMOBILE

(75) Inventor: Akihiro Yamada, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/292,193

(22) Filed: Apr. 15, 1999

(30) Foreign Application Priority Data

Apr. 17, 1998 (JP) .................................................. 10-108102

(51) Int. Cl.[7] .............................. G06F 7/00; G06F 17/00
(52) U.S. Cl. ................................ 701/1; 701/99; 701/102; 340/426; 340/457; 455/422
(58) Field of Search ..................... 701/1–10, 33, 701/102, 99; 340/980, 426, 457; 455/422

(56) References Cited

U.S. PATENT DOCUMENTS

| | | | | |
|---|---|---|---|---|
| 5,148,546 | * | 9/1992 | Blodgett ................................. | 395/750 |
| 5,423,045 | * | 6/1995 | Kannan et al. ........................ | 395/750 |
| 5,659,459 | * | 8/1997 | Wakabayashi et al. ............... | 361/753 |
| 6,025,695 | * | 2/2000 | Friel et al. ............................. | 320/106 |
| 6,028,537 | * | 2/2000 | Suman et al. ......................... | 340/988 |

* cited by examiner

Primary Examiner—Tan Nguyen
Assistant Examiner—Ronnie Mancho
(74) Attorney, Agent, or Firm—Frommer Lawrence & Haug, LLP.; William S. Frommer; Dennis M. Smid

(57) ABSTRACT

The present invention relates to an onboard information processing apparatus suitable for processing carried out by information handling equipment mounted on a movable body such as an automobile and relates to an automobile on which the information processing apparatus is mounted. The onboard information processing apparatus comprises a plurality of pieces of onboard information handling equipment installed in a vehicle. Each of the pieces of onboard information handling equipment has a connection unit for connection with a bus line of a predetermined format. The connection units of the pieces of onboard information handling equipment are connected to each other by the bus line. When a piece of onboard information handling equipment is not used, said connection unit of the piece of onboard information handling equipment is put in a sleep mode, providing electric power only to a minimum number of components requiring electric power.

5 Claims, 11 Drawing Sheets

FIG. 4
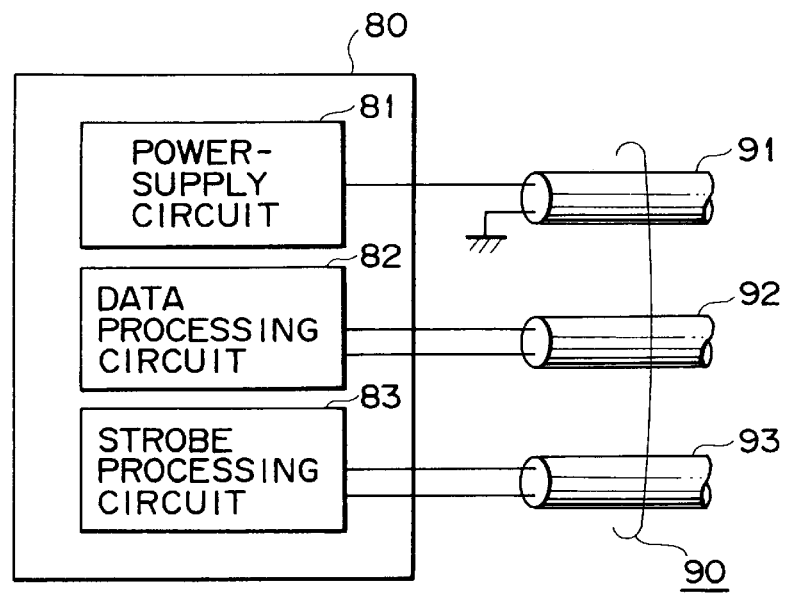
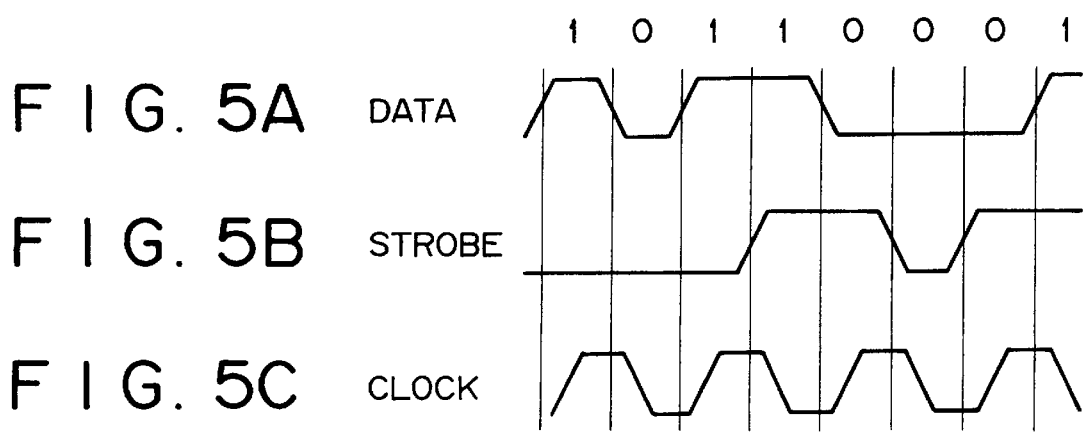
FIG. 5A  DATA
FIG. 5B  STROBE
FIG. 5C  CLOCK

ONBOARD INFORMATION PROCESSING APPARATUS AND AUTOMOBILE

FIELD OF THE INVENTION

The present invention relates to an onboard information processing apparatus well suitable for processing carried out by information handling equipment mounted on a movable body such as an automobile and relates to an automobile on which the information processing apparatus is mounted.

BACKGROUND OF THE INVENTION

In recent years, various kinds of information handling equipment are mounted on a movable body such as an automobile, allowing various kinds of information processing to be carried out. An example of information handling equipment becoming popular is a radio receiver that is capable of reproducing audio information from a broadcast wave received from a radio broadcasting station and displaying literal data such as information on traffic included in the broadcast wave. In addition, an apparatus for playing back information from a variety of audio recording media such as a compact disc (CD) is also becoming popular as the so-called car audio apparatus.

Furthermore, there are some movable bodies each having an onboard navigation apparatus for processing information included in a position measurement signal received from a source such as an artificial satellite to determine the position and the running state of the movable body.

On the top of that, there are also some movable bodies each provided with a radio telephone apparatus called a car telephone or a portable telephone allowing the movable body to establish a telephone conversation and to transmit or receive data. As such, the information handling equipment mounted on a movable body such as an automobile has been exhibiting an increasing trend in volume in recent years.

By the way, these kinds of onboard information handling equipment are installed in a vehicle with almost no relation to other information handling equipment. As an apparatus having a plurality of functions, the equipment is no more than a car audio apparatus with a radio receiver incorporated therein. Thus, each time a new piece of information handling equipment is added, it is traditionally necessary to provide wiring for installing the new equipment in the vehicle. As a result, it is necessary to provide an extremely large amount of wiring for information handling equipment installed in the automobile.

Accompanying the increasing amount of wiring, there has been developed an onboard information bus line for integrating and controlling pieces of information handling equipment by connecting the pieces of equipment to each other. Each piece of information handling equipment has a connection unit for connecting the piece of equipment to the onboard information bus line. The onboard information bus line has a configuration wherein the connection unit of each piece of information handling equipment is connected to the onboard information bus line.

However, such onboard information bus line requires electric power for operating the connection unit of each piece of information handling equipment. Thus, as the number of pieces of onboard information handling equipment increases, the required electric power may exceed the capacity of a battery which serves as a power source. For this reason, the need to save electric power further rises.

On the other hand, while it is desirable to turn off the power supply of each of information handling equipment to save electric power, the pieces of equipment can not be activated individually and independently of each other since they are connected to each other through the onboard information bus line. As a result, there arises a problem of poor operatability.

SUMMARY OF THE INVENTION

An object of the present invention is to provide an onboard information processing apparatus which is capable of saving electric power and allows pieces of information handling equipment to be activated individually, and to provide an automobile with the onboard information processing apparatus mounted thereon.

The object of the present invention can be achieved by providing an onboard information processing apparatus comprising a plurality of pieces of onboard information handling equipment installed in a movable body such as a vehicle. The pieces of onboard information handling equipment each have a bus line connection unit for connecting the equipment to a bus line of a predetermined type. The connection units of the pieces of onboard information handling equipment are connected to each other by the bus line. A connection unit is put in a sleep mode when the onboard information handling equipment employing the connection unit is not in use to implement an onboard information processing apparatus wherein only a minimum required power supply is consumed.

In the configuration described above, the connection units of a plurality of pieces of onboard information handling equipment are connected to each other by the bus line and a connection unit is put in a sleep mode when the onboard information handling equipment employing the connection unit is not in use so as to supply only a minimum required electric power. As a result, the amount of electric power consumed by the connection units is reduced considerably and energy consumed during the use of the onboard information bus line can hence be saved.

It is desirable to provide an onboard information processing apparatus and an automobile with the onboard information processing apparatus mounted thereon wherein the sleep mode of a connection unit is ended and the connection unit is switched to a standby mode after a predetermined period of time has elapsed since the start of the sleep mode.

In this configuration, a connection unit transits from a sleep mode to a standby mode after a predetermined period of time has elapsed since the start of the sleep mode so that, in the standby mode, when an operation is operated on the information handling equipment employing the connection unit, the power supply of the information handling equipment is turned to supply electric power to the entire connection unit, allowing processing corresponding to the operation to be carried out.

It is also desirable to provide an onboard information processing apparatus and an automobile with the onboard information processing apparatus mounted thereon wherein a connection unit transits back to a sleep mode if neither data is transferred nor operation is carried out during a predetermined period of time following the transition to a standby mode.

In this configuration, a connection unit transits back to a sleep mode after a standby mode has been continuing for a predetermined period of time, allowing saving of electric power to be implemented in a finely controlled manner.

It is further desirable to provide an onboard information processing apparatus and an automobile with the onboard information processing apparatus mounted thereon wherein components receiving electric power in a sleep mode of a connection unit include a state saving means for saving states of the connection unit prior to the sleep mode and a clock means for measuring a predetermined period of time.

In this configuration, when the end of the predetermined period of time in a sleep mode is detected by the clock means, the sleep mode is terminated to let the each connection unit enters a standby mode in which the states prior to the sleep mode saved by the state saving means are read and in when electric power is supplied to the entire connection unit, allowing all portions of the connection unit to be returned to the states prior to the sleep mode.

BRIEF DESCRIPTION OF THE DRAWINGS

FIG. 4 is a diagram showing the configuration of a port employed in the embodiment of the present invention;

FIGS. 5A to 5C are diagrams showing the waveforms of signals in typical transmission of data in the embodiment of the present invention;

DETAILED DESCRIPTION OF THE PREFERRED EMBODIMENT

An embodiment of the present invention is described by referring to the accompanying diagrams as follows.

Since the embodiment described below is a preferred implementation of the present invention, a variety of technically desirable limitations are imposed on the embodiment. It should be noted, however, that the scope of the present invention is not limited by the embodiment unless otherwise specially stated in the following description that the present invention is so limited.

Figure 1:
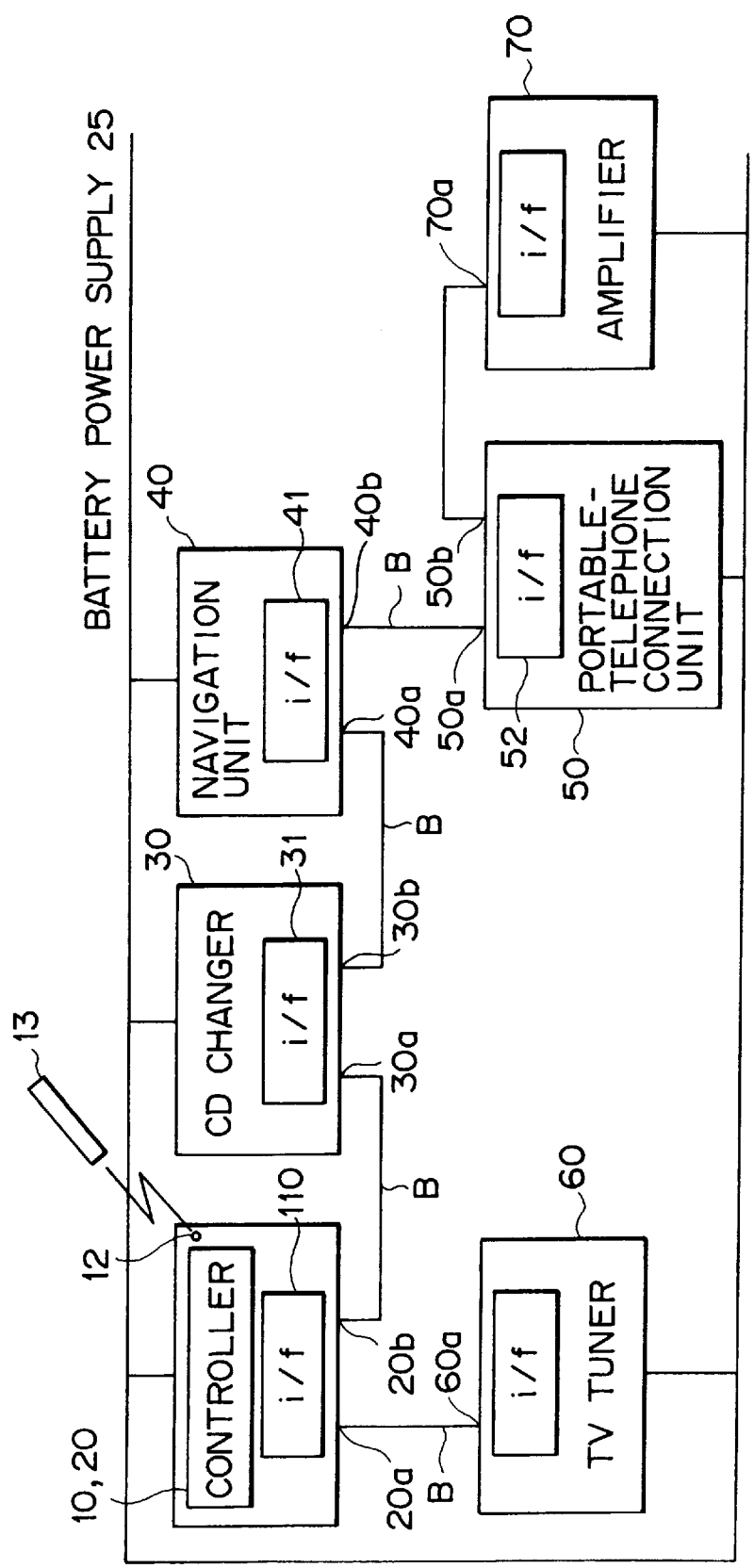
FIG. 1 is a block diagram showing a system configuration of an embodiment of the present invention.
Figure 2:
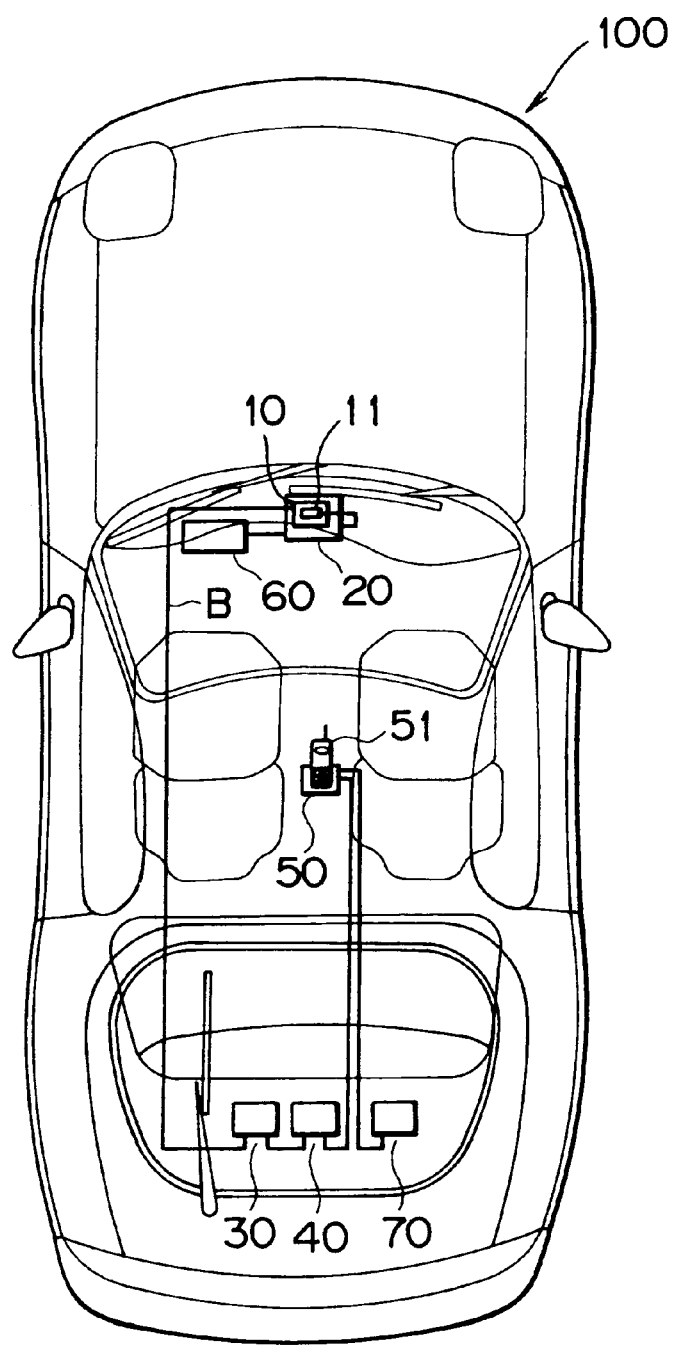
FIG. 2 is a diagram showing a top view of how the embodiment of the present invention is typically installed on an automobile.

First of all, the configuration of the whole system of the information processing apparatus implemented by the embodiment is explained by referring to FIGS. 1 and 2. This embodiment implements an information processing system installed on a movable body which is an automobile in this case. To put it concretely, an automobile 100 accommodates a driving means such as an internal combustion engine which consumes typically gasoline as a fuel as shown in FIG. 2. The driving means rotates the wheels of the automobile, putting the automobile in a travel-motion state under control exercised by the driver.

On a dash board of the automobile 100, a monitor unit 10 is installed. The monitor unit 10 is implemented by a liquid-crystal image picture panel which has a relatively small size.

The monitor unit 10 is connected to a controller 20. Various kinds of information output by the controller 20 are displayed on a monitor display unit 11 employed in the monitor unit 10. The controller 20 is connected to various kinds of information processing equipment by a predetermined bus line, that is, an onboard information bus line B. It should be noted that the present invention can be applied not only to an automobile but also to a variety of movable bodies.

Pieces of equipment connected to the controller 20 as shown in FIG. 1 are connected to each other by the bus line to be described later. Typically, the equipment is a CD changer 30, a navigation unit 40, a portable-telephone connection unit 50, a television tuner 60 and an amplifier 70 serving as an audio unit which are connected to each other by the onboard bus line B in a predetermined order. The CD changer 30, the navigation unit 40, the television tuner 60 and the amplifier 70 are installed in available spaces in the vehicle such as the space under the dash board and the space inside the trunk. On the other hand, the portable-telephone connection unit 50 is typically placed at a location in the vehicle in close proximity to the driver's seat.

Installed in the automobile 100 in advance, these pieces of onboard equipment are driven to be operated by electric power supplied by a battery power supply of the automobile. The configuration also allows various kinds of portable information handling equipment to be connected to the system through the onboard information bus line B.

As described above, the monitor unit 10 has a monitor display unit 11 implemented by typically a liquid-crystal panel for displaying a predetermined image or a predetermined picture under control executed by the controller 20. In addition, the monitor unit 10 also has a remote-control-signal receiving unit 12 for receiving an infrared-ray signal transmitted by a remote control device 13 and transmitting control information represented by the received signal to the controller 20.

Figure 3:
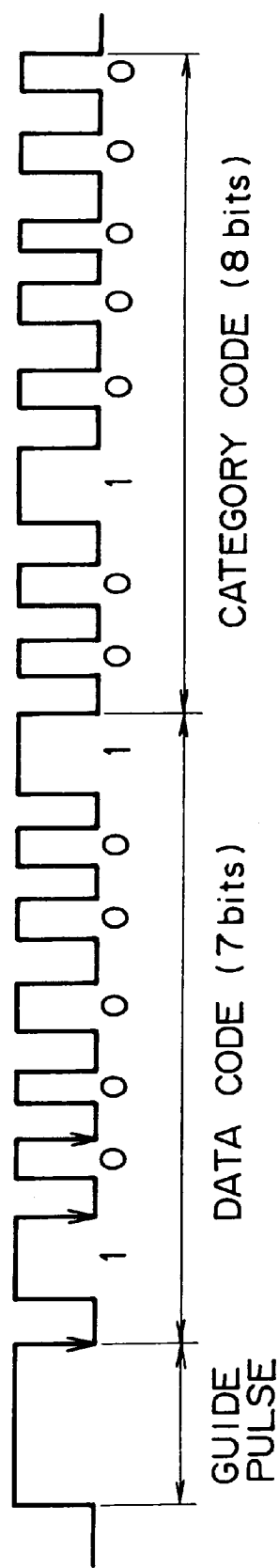
FIG. 3 is a diagram showing the waveform of a typical control signal generated in the embodiment of the present invention.

The remote control device sets an equipment code in an infrared-ray signal transmitted due to an operation of a key provided on the front surface of the device as data suitable for a piece of equipment to be operated. A typical infrared-ray signal transmitted by the remote control device 13 is shown in FIG. 3. As shown in FIG. 3, the infrared-ray signal is a pulse signal. The period of a high level of a pulse is a period during which an infrared ray is emitted. On the other hand, the period of a low level of a pulse is a period during which no infrared ray is emitted.

As shown in FIG. 3, a transmission of 1 unit of an infrared-ray signal starts with a guide pulse having a predetermined length to be followed by a data code with a predetermined number of bits representing control information. In this example, the number of data-code bits is 7. The data code is finally followed by a category code with a predetermined number of bits representing the type of equipment to be controlled. In this example, the number of category-code bits is 8. To be more specific, the remote control device 13 for navigation is distinguished from the remote control device 14 by the category code.

The controller 20 identifies the category code of a remote control signal received by the remote-control-signal receiving unit 12 in order to determine which equipment connected to the onboard information bus line is to be controlled and transfers the control information to the equipment.

As the onboard bus line for connecting the pieces of equipment to the controller 20, typically, a bus line conforming to standards called the IEEE1394 is employed. The standards are set by the IEEE (Institute of Electrical and Electronics Engineers). The bus line conforming to the IEEE1394 standards is implemented by a connection cable 90 which comprises a power-supply line 91, a data line 92 and a strobe line 93 bundled and shielded to form a single cable as shown in FIG. 4. As shown in the figure, a port 80 connected to the connection cable 90 comprises a power-supply circuit 81, a data processing unit 82 and a strobe processing unit 83. The power-supply circuit 81 carries out processing to output or input a direct-current low voltage to or from the power-supply line 91. The data processing unit 82 carries out input/output processing of data transmitted through the data line 92. By the same token, the strobe processing unit 83 carries out input/output processing of a strobe transmitted through the strobe line 93.

A strobe transmitted through the strobe line 93 is a signal complementing data transmitted through the data line 92. By computing an exclusive logical sum of the data and the strobe, a clock of the data can be generated. Pay attention to waveforms shown in FIGS. 5A to 5C wherein data transmitted through the data line 92 and a strobe transmitted through the strobe line 93 are shown in FIGS. 5A and 5B respectively. As shown in the figure, the strobe is inverted with timing with which the data is not changed. FIG. 5C shows the waveform of a clock signal generated on the receiver side as an exclusive logical sum of the data and the strobe.

In a port connected to a bus line conforming to the IEEE1394 standards, an address assigned to each piece of connected equipment is automatically appended to transmitted information to specify a destination of the information.

Figure 6:
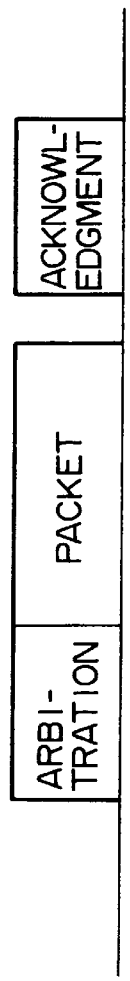
FIG. 6 is a diagram showing the configuration of asynchronous transmission of a packet in the embodiment of the present invention.

As methods for transmitting data by using a bus line conforming to the IEEE1394 standards, there are provided 2 modes, namely, an asynchronous transfer mode and an isochronous transfer mode or a real-time data transfer mode which are used in dependence on the type of data to be transmitted. To put it concretely, data such as control information of equipment is transmitted in the asynchronous transfer mode in packet units. FIG. 6 is a diagram showing a packet transferred in the asynchronous transfer mode. A port desiring a data transfer carries out arbitration for acquiring the bus line. As a right to transfer data through the bus line is acquired from the arbitration, a data packet is transmitted. The data packet comprises a header and a data portion. The header includes pieces of information such as a destination address, an originator address and the size of data being transferred. On the other hand, the data portion is data actually being transmitted. In addition, the header and the data portion each include a CRC code for error correction.

In the synchronous transfer mode, the data receiver transmits a result of reception in response to the received data to the originator as an acknowledgment code for acknowledging the reception. The above processing is carried out repeatedly as long as there is data to be transmitted.

Figure 7:
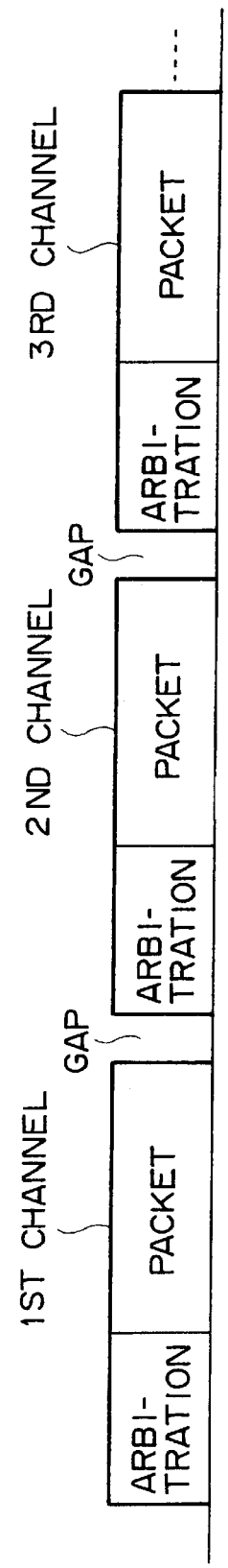
FIG. 7 is a diagram showing the configuration of isochronous transmission of packets in the embodiment of the present invention.

A large amount of information such as video or audio data which needs to be transmitted in a real-time manner is transferred in the isochronous transfer mode. FIG. 7 is a diagram showing packets transferred in the isochronous transfer mode. A port desiring a data transfer carries out arbitration for acquiring the bus line for an initial channel or the first channel. As a right to transfer data through the bus line is acquired from the arbitration, a data packet for the first channel is transmitted. With this data packet, any information such as video data is transmitted. Then, arbitration and transmission of data for the second channel are carried out after a predetermined period of time has lapsed since the end of the transmission of the packet of the first channel. Subsequently, the transmission of data through is carried out repeatedly through as many channels as required till all data is transmitted. A transfer of data in the isochronous transfer mode takes precedence of a transfer of data in the asynchronous mode. Thus, the isochronous transfer mode assures a transfer band. In the isochronous transfer mode, a return code for acknowledging reception is not transmitted.

By connecting pieces of equipment to the onboard information bus line with a configuration described above, various kinds of information can be transferred among any plurality of pieces of equipment within the pieces of equipment connected to the bus line.

Refer back to FIG. 1. The controller 20 also includes an audio playback processing unit 22 and an interface unit 110 which serves as a connection unit for connecting the controller 20 to the onboard information bus line B. As shown in detail in FIG. 8, the interface unit 110 comprises a controller 120, a link layer 130 and a physical layer 140.

Figure 8:
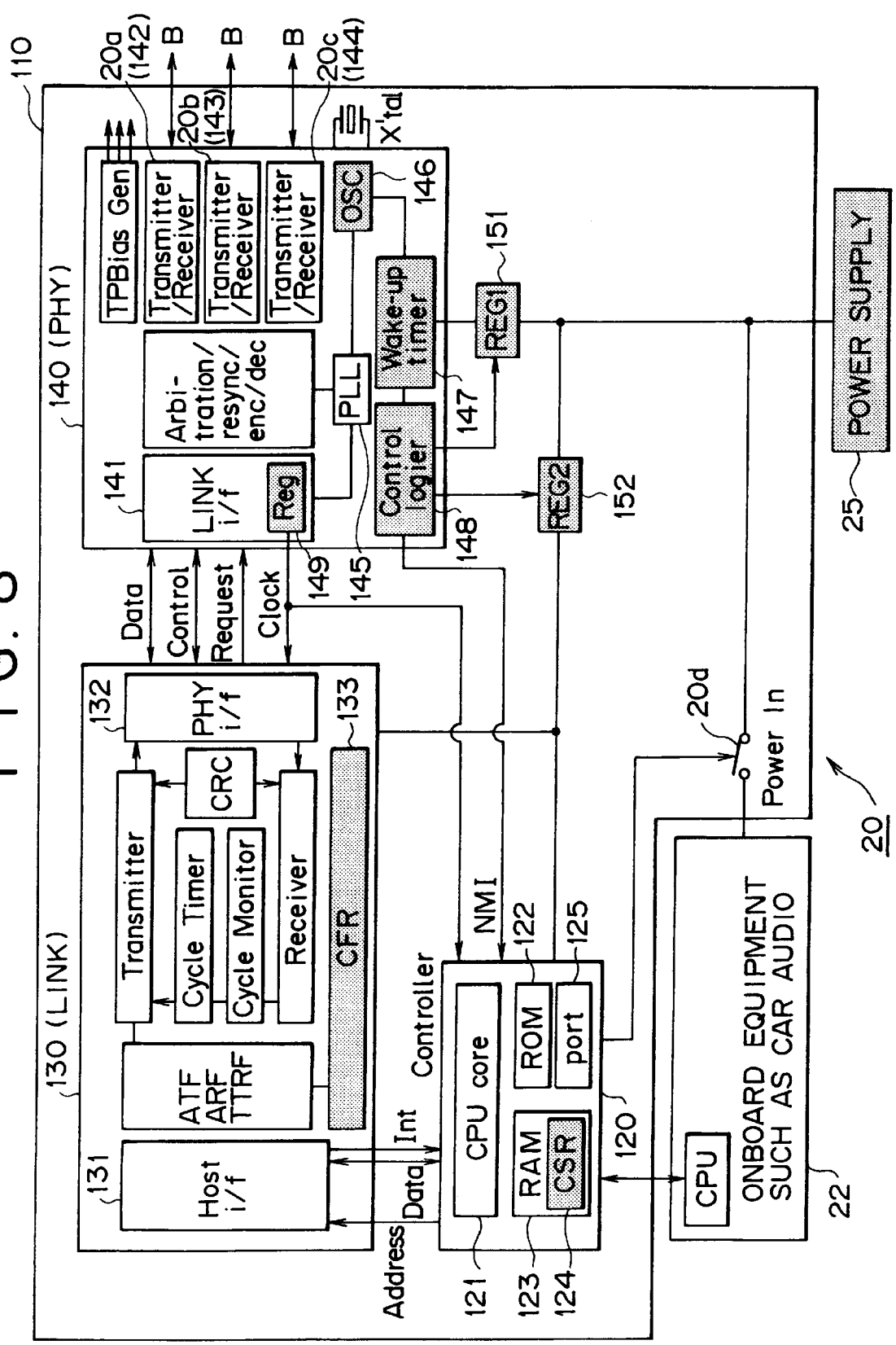
FIG. 8 is a block diagram showing a detailed configuration of an interface of the embodiment of the present invention.

In the case of the example shown in FIG. 8, the physical layer 140 comprises three ports 20a, 20b and 20c for connecting the physical layer 140 to the onboard information bus line B. The ports each comprise a transmitter and a receiver. In this embodiment, the port 20b is connected to a port of the CD changer 30 by the onboard information bus line B and the other port 20a is connected to the TV tuner 60 as shown in FIG. 1. These ports 20a, 20b and 20c each have a configuration identical with the port 80 shown in FIG. 3.

In the configuration described above, audio and video signals output by the audio playback processing unit 22 are output to the onboard information bus line B by way of the interface unit 110.

The port 20b of the controller 20 is connected by the onboard information bus line B to a port 30a of the CD changer 30. The CD changer 30 comprises a CD magazine for setting a plurality of CDs, an optical pickup for playing back signals from a CD selected from those set in the CD magazine, a servo circuit for controlling an operation to drive the optical pickup, a DSP for processing a playback signal output by the optical pickup, a control unit for controlling these components and an interface unit 31. The interface unit 31 comprises two ports 30a and 30b for connecting the CD changer 30 to the onboard information bus line B.

In the above configuration, audio and video signals played back from a CD in the CD changer 30 are output to the onboard information bus line B by way of the interface unit 31.

A port 30b of the CD changer 30 is connected by the onboard information bus line B to the port 40a of the navigation unit 40. The navigation unit 40 finds the present position of an automobile by resorting to a positioning system such as the GPS (Global Positioning System) The navigation unit 40 also carries out processing to create picture information showing a road map of typically an area in close proximity to the current position of the automobile by using a reading unit for reading out data from a map disc implemented typically by a CD-ROM for storing information on road maps. The navigation unit 40 has an interface unit 41 which comprises two ports 40a and 40b for connecting the navigation unit 40 to the onboard information bus line B.

It should be noted that the navigation unit 40 is connected to a GPS antenna.

The port 40b of the navigation unit 40 is connected to a port 50a of the portable-telephone connection unit 50 to be described later by the onboard information bus line B. The portable-telephone connection unit 50 is connected to the portable telephone 51 shown in FIG. 2 so that a variety of operations of the portable telephone 51 can be carried out from the controller 20. The portable-telephone connection unit 50 has an interface unit 52 comprising ports 50a and 50b for connecting the portable-telephone connection unit 50 to the onboard information bus line B.

The port 50b of the portable-telephone connection unit 50 is connected to the port 70a of the amplifier 70 employed in the car audio apparatus by the onboard information bus line B.

On the other hand, the port 20b of the controller 20 is connected to the port 60a of the television tuner 60 by the onboard information bus line B. The television tuner 60 demodulates a television broadcast wave of a channel received through a connected antenna, outputting video information and audio information obtained as a result of the demodulation to the onboard information bus line B connected thereto.

The following is a description of a detailed configuration of pieces of information handling equipment constituting a system implemented by the embodiment, namely, the controller 20, the CD changer 30, the navigation unit 40, the portable-telephone connection unit 50, the television tuner 60 and the interface unit 110 provided in the amplifier 70 with reference to FIG. 8.

In the configuration shown in FIG. 8, the interface unit 110 comprises the controller 120, the link layer 130 and the physical layer 140 as described earlier.

The controller 120 comprises a CPU 121, a ROM unit 122, a RAM unit 123 and a means for temporarily storing contents of the RAM unit 123 such as a register 124. In addition, the controller 120 also has a port 125 for turning on and off the power-supply switch of an associated piece of information handling equipment such as the power-supply switch 20d of the controller 20. With such a configuration, the controller 120 is capable of carrying out transaction-layer processing on asynchronous and isochronous transmissions by analyzing the cause of an interrupt coming from the link layer 130 and taking an action for the interrupt.

The link layer 130 comprises a host interface 131 for connecting the link layer 130 to the controller 120 and a physical interface 132 for connecting the link layer 130 to the physical layer 140. In addition, the link layer 130 also has a circuit for carrying out a CRC check of data received from the physical layer 140, transmitting data to be transmitted and activating a cycle timer, in accordance with a parameter stored in a register (CFR) 133.

The physical layer 140 comprises a link interface 141 for connecting the physical layer 140 to the link layer 130, three pairs of transmitter/receiver 142, 143 and 144 serving as ports 20a, 20b and 20c respectively and a circuit for adjusting the onboard information bus line B, repeating transmitted data and encoding as well as decoding data transmitted through the onboard information bus line B. In addition, the physical layer 140 also includes a PLL circuit 145 for driving these circuits, an oscillation circuit 146, a timer (a wake-up timer) 147 and a control logic circuit 148. The timer 147 is used as a clock means specially set by this embodiment. It should be noted that, a register 149 is provided inside the link interface 141.

In the interface unit 110, a driving voltage generated by the battery power supply 25 is supplied to the physical layer 140 by way of a register 151 and to the controller 120 and the link layer 130 by way of a register 152. The registers 151 and 152 are turned on and off under control executed by the control logic circuit 148 employed in the physical layer 140.

In a state of the sleep mode, electric power is supplied only to components hatched by fine points in FIG. 8. To be more specific, electric power is supplied only to the register 124 employed in the controller 120, the register 133 employed in the link layer 130, and the oscillation circuit 146, the timer 147, the control logic circuit 148 and the register 149 employed in the physical layer 140.

When a key of a piece of information handling equipment is operated, the remote control device is operated, a call arrives at the portable telephone 51 or another operation is carried out in this state, the registers 151 and 152 are turned on, the interface unit 110 starts its operation, the bus is reset and a transition to a standby mode occurs.

In the standby mode, the interface unit 110 saves data such as status and a required information band or connection information of each piece of information handling equipment after the bus has been reset. In this case, the main power supply of each piece of information handling equipment is off.

In addition, if an operation is carried out on particular pieces of information handling equipment individually in the standby mode, the particular pieces of information handling equipment each transit from the standby mode to an active mode, entering a state of being capable of operating. It should be noted that, in this case, the user is allowed to turn off the main power supply of any piece of information handling equipment.

The configuration of the onboard information processing system provided by the embodiment has been described so far. Next, the operation of the embodiment is explained by referring to flowcharts shown in FIGS. 9 to 12.

In the onboard information bus system described above, there are two types of power-on, namely, power-on reset and power save on reset.

First of all, an example of the power-on reset is explained. The power-on reset is a regular power-on operation whereby all electric power is supplied to the information bus line B even if the engine of the automobile 100 is halted so that all pieces of information handling equipment connected to the onboard information bus line B operate. The regular power-on operation is carried out by turning the engine key to an accessory-key (ACC) position at which the user can immediately listen to an FM radio or the like and the power supplies of deselected pieces of equipment other than the FM radio are also turned on.

Figure 9:
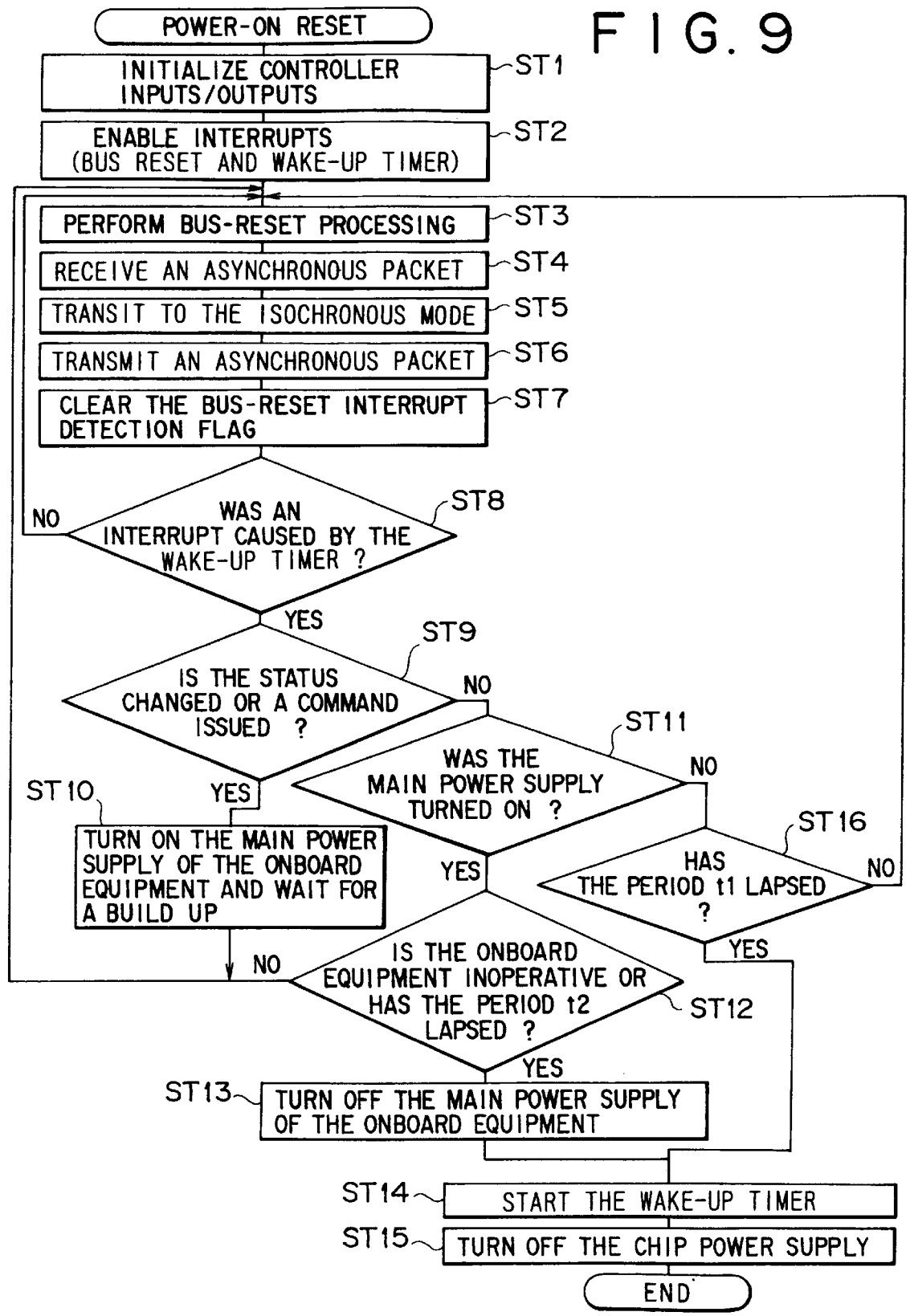
FIG. 9 shows a flowchart representing typical main processing carried out by a controller employed in the interface of the embodiment of the present invention during a power-on reset.

The flowchart shown in FIG. 9 begins with a step ST1 at which the power-on operation is carried out and inputs and outputs of the controller 120 are initialized. The flow of the operation then goes on to a step ST2 at which the controller 120 resets the bus B and enables interrupts by the timer 147.

Then, the flow of the operation proceeds to a step ST3 at which the controller 120 carries out bus-reset processing for all pieces of equipment connected to the bus line B. The bus-reset processing will be described later by referring to the flowchart shown in FIG. 11.

The flow of the operation then continues to a step ST4 at which the controller 120 carries out reception processing in an asynchronous transfer mode. As a period of time set in advance lapses, the flow of the operation goes on to a step ST5 at which the mode is switched to a isochronous transfer mode. Subsequently, the flow of the operation continues to a step ST6 at which processing to receive packets in the isochronous transfer mode is carried out.

Then, the flow of the operation continues to a step ST7 at which a flag for detecting a bus-reset interrupt is cleared. The flow of the operation then continues to a step ST8 to form a judgment as to whether or not an interrupt caused by the timer 147 exists. If an interrupt caused by the timer 147 does not exist, the flow of the operation goes back to the step ST3.

If the outcome of the judgment formed at the step ST8 indicates that an interrupt caused by the timer 147 exists, on the other hand, the flow of the operation goes on to a step ST9 to form a judgment as to whether or not there is a change in status or a judgment as to whether or not a command has been issued. An example of a change in status is connection or disconnection of a piece of information to or from the onboard information bus line B and an example of a command is an operation carried out on a piece of information handling equipment.

If a piece of information has been connected to the onboard information bus line B or a command has been issued, the flow of the operation proceeds to a step ST10 at which the main power supply of the piece of information handling equipment is turned on to wait for a build-up time of the piece of information handling equipment to complete. The flow of the operation then goes back to the step ST3.

If the outcome of the judgment formed at the step ST9 indicates that neither there is a change in status such as connection or disconnection of a piece of information to or from the onboard information bus line nor a command such as an operation carried out on a piece of information handling equipment has been issued, on the other hand, the flow of the operation goes on to a step ST11 to form a judgment as to whether or not the main power supply of the piece of information handling equipment has already been turned on. If the main power supply of the piece of information handling equipment has already been turned on, the flow of the operation goes on to a step ST12 to form a judgment as to whether or not the piece of information handling equipment is operating or a judgment as to whether or not a predetermined period of time t2 has lapsed. If the piece of information handling equipment is operating or the predetermined period of time t2 has not lapsed yet, the flow of the operation goes back to the step ST3 to prepare for transmission of data. The period of time t2 is a control period during which the power-on states of pieces of equipment are saved.

If the outcome of the judgment formed at the step ST12 indicates that the piece of information handling equipment is not operating or the predetermined period of time t2 has already lapsed, on the other hand, the flow of the operation goes on to a step ST13 at which the main power supply of the piece of information handling equipment is turned off. The flow of the operation then proceeds to a step ST14.

At the step ST14, the controller 120 starts the timer 147. Then, the flow of the operation continues to a step ST15 to turn off a chip power supply, that is, to turn off the power supplies of the controller 120, the link layer 130 and the physical layer 140 which are employed in the interface unit 110 in order to transit to a sleep mode. In this mode, electric power is saved till the operation of the timer 147 is ended.

If the outcome of the judgment formed at the step ST11 indicates that the main power supply of the piece of information handling equipment is off, on the other hand, the flow of the operation continues to a step ST16 to form a judgment as to whether or not a predetermined period of time t1 has lapsed. If the period of time t1 has not lapsed, the flow of the operation goes back to the step ST3. If the period of time t1 has lapsed, on the other hand, the flow of the operation goes on to a step ST14.

It should be noted that, the period of time t1 is a provided control period during which bus activation states are saved in order to save the physical layer 140 electric power and the period of time t2 is a provided control period during which power-on states of pieces of equipment are saved. The lapses of the periods of time t1 and t2 are each detected by a software timer of the controller 120 provided separately from the timer 147.

The following is a description of the power save on reset, another power-on reset mode provided by the bus line B of the onboard information handling equipment system.

Figure 10:
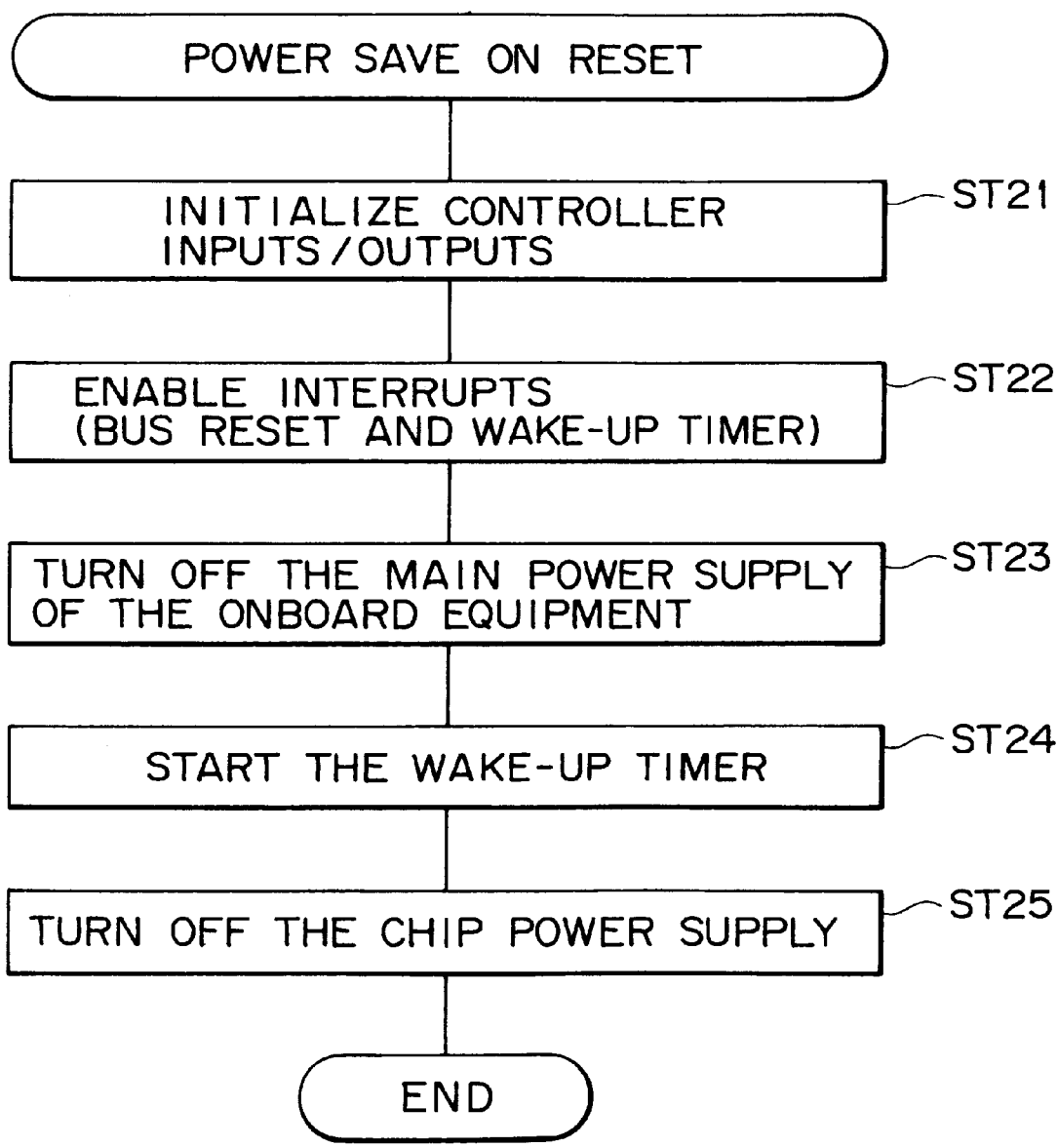
FIG. 10 shows a flowchart representing typical main processing carried out by the controller employed in the interface of the embodiment of the present invention during a power-save-on reset.

As shown in the flowchart of FIG. 10, the power save on reset begins with a step ST21 at which the power-on operation is carried out and inputs and outputs of the controller 120 are initialized. The flow of the operation then goes on to a step ST22 at which interrupts by the timer 147 are permitted.

Then, the flow of the operation proceeds to a step ST23 at which the main power supplies of the pieces of information handling equipment are immediately turned off. The flow of the operation then continues to a step ST24 at which the timer 147 is started. Subsequently, the flow of the operation goes on to a step ST25 to turn off the chip power supply, that is, to turn off the power supplies of the controller 120, the link layer 130 and the physical layer 140 which are employed in the interface unit 110 in order to transit to a sleep mode. In this mode, electric power is saved till the operation of the timer 147 is ended.

Figure 12:
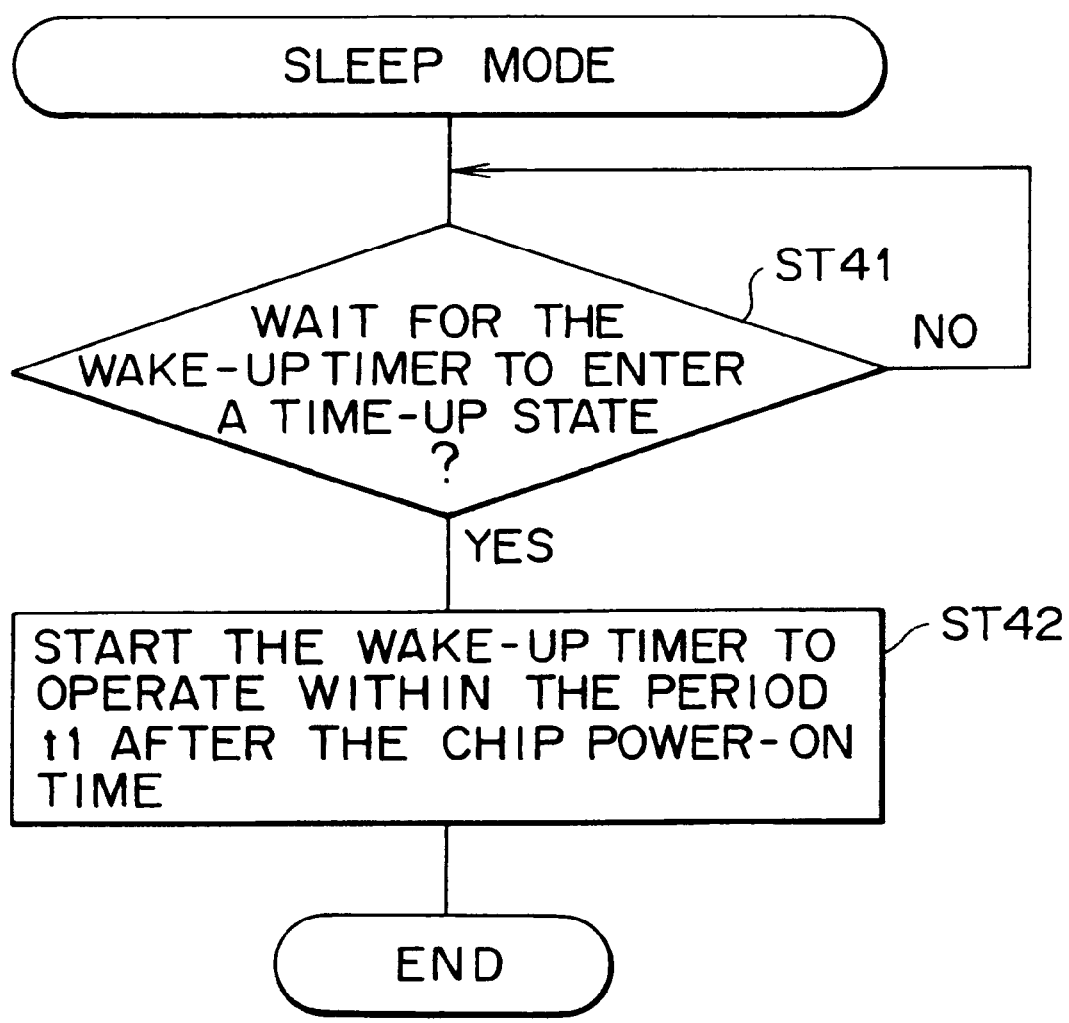
FIG. 12 shows a flowchart representing the operation of a timer employed in the embodiment of the present invention during a power-on reset.

In the sleep mode, the timer 147 employed in the interface unit 110 enters a time-up state as a predetermined period of time lapses as shown in the flowchart of FIG. 12 due to the fact that the power supply is on all the time. The controller 120 controls the registers 151 and 152 so as to supply electric power to the entire link layer 130 and the entire physical layer 140. A transition to a standby mode thereby occurs.

Then, by generating an interrupt to the controller 120, pieces of processing following the bus-reset processing performed at the step ST3 of the power-on reset shown in FIG. 9 are carried out.

Figure 13:
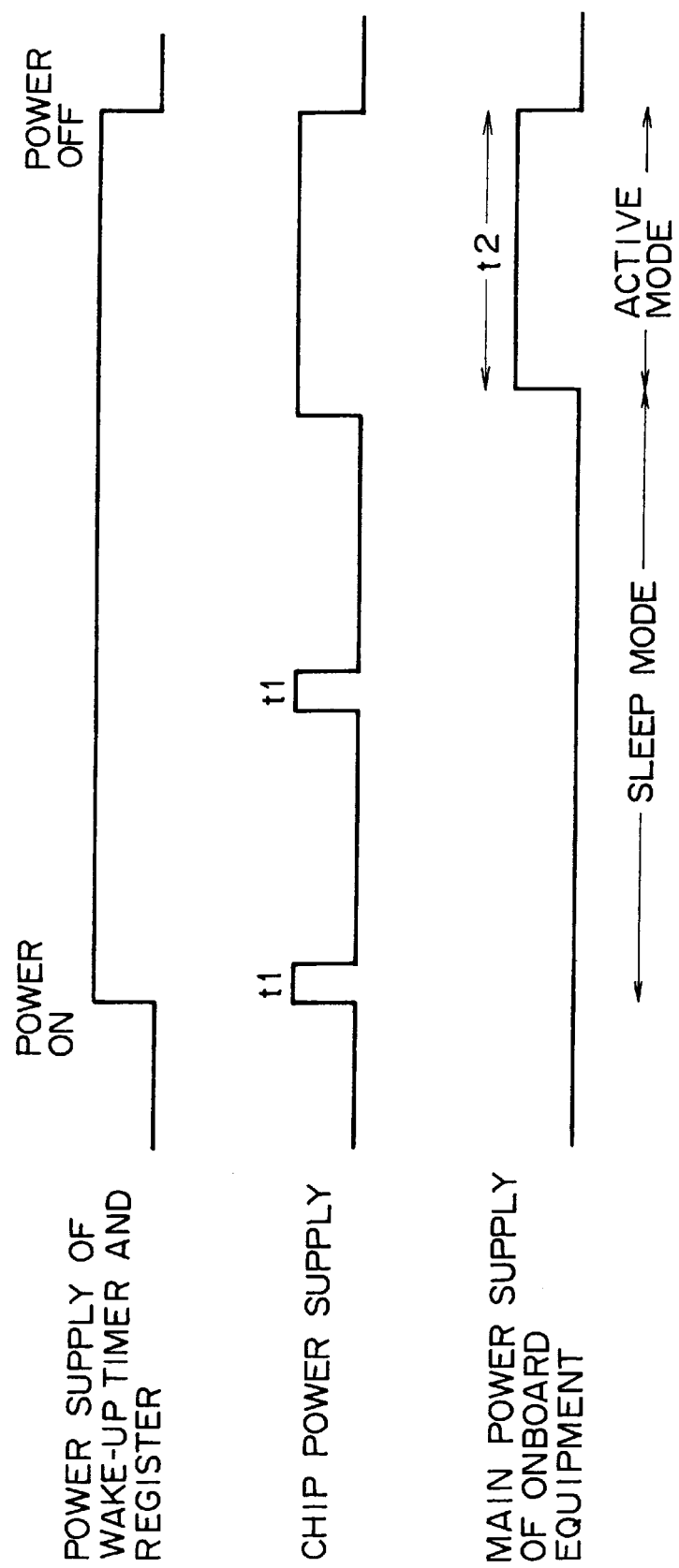
FIG. 13 shows time charts depicting a transition from a sleep mode to an active mode in the embodiment of the present invention.

When an interrupt was generated from the sleep mode, if neither a key operation is carried out nor a command is issued during the predetermined period of time t1, the chip power supply is turned off again to transit back to the sleep mode as shown in FIG. 13. If either a key operation is carried out or a command is issued during the predetermined period of time t1, on the other hand, much like the step ST10 of the flowchart shown in FIG. 9, the main power supply of the piece of information handling equipment is turned on to wait for a build-up time of the piece of information handling equipment to complete and necessary processing is carried out in response to the key operation and the command described above.

If the piece of information handling equipment does not operate even after the predetermined period of time t2 has lapsed with the main power supply of the piece of information handling equipment turned on indicating that there is no pending command, a transition back to the sleep mode occurs as shown in FIG. 13. To put it in detail, the main power of the piece of information handling equipment is turned off, the timer 147 is started and the chip power supply is turned off.

Figure 11:
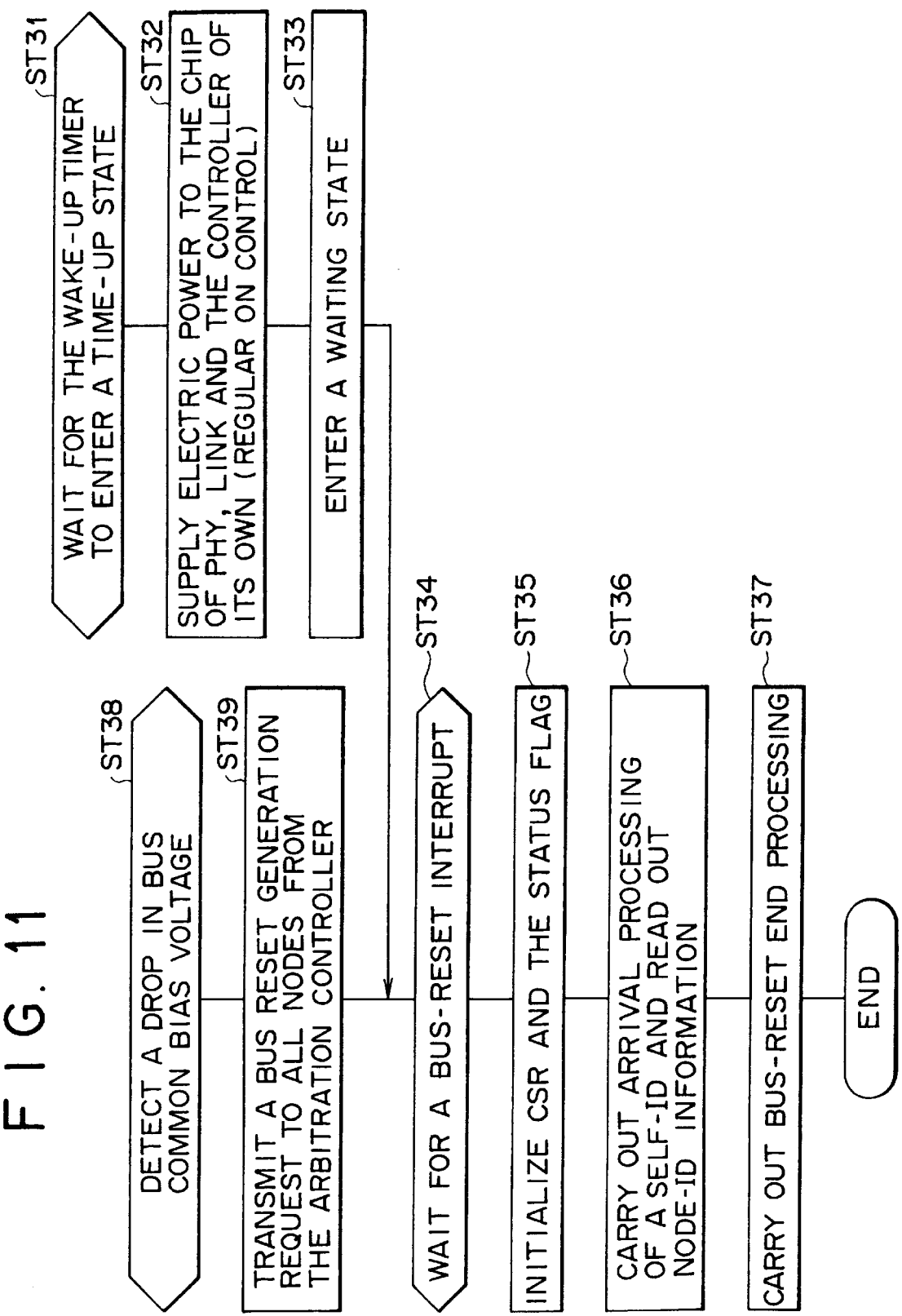
FIG. 11 shows a flowchart representing typical processing carried out by the embodiment of the present invention during a bus reset.

FIG. 11 shows a flowchart representing an example of the bus-reset processing.

As shown in FIG. 11, the flowchart begins with a step ST31 to wait for the timer 147 to enter a time-up state in a regular sleep mode. As the timer 147 enters a time-up state, the flow of the processing goes on to a step ST32 at which the chip power supply of the interface unit 110 is turned on to activate by each piece of information equipment thereof at all but the sam e time. Then, the flow of the processing proceeds to a step ST33 to wait for the interface unit 110 of other pieces of information handling equipment to build up.

Later on, the flow of the processing continues to a step ST34 to wait for a bus-reset interrupt to be generated to the controller 120 employed in the interface unit 110. Such an interrupt causes a bus-reset operation to be carried out in accordance with a procedure determined by the normal IEEE1394 standards. To put it in detail, when such an interrupt is generated, the flow of the processing continues to a step ST35 at which the register 124 and a status flag are initialized. The flow of the processing then goes on to a step ST36 at which arrival processing of a self ID is carried out and node-ID information is read out. Subsequently, the flow of the processing proceeds to a step ST37 at which bus-reset end processing is carried out.

It should be noted that the bus-reset processing can also be initiated as follows. For example, when a drop of a common bias voltage of the onboard information bus line is detected at a step ST38 of the flowchart shown in FIG. 11, the flow of the processing goes on to a step ST39 at which an arbitration controller employed in the physical layer 140 transmits a bus reset generation request to all nodes before proceeding to the step ST34.

According to a system implemented by the embodiment as described above, pieces of information handling equipment connected to the onboard information bus line can be operated in cooperation with each other and the pieces of equipment can be installed inside an automobile in an efficient way by merely using an onboard information bus line. When a piece of information handling equipment is not used, the interface unit of the piece of information handling equipment for interfacing with the onboard information bus line provides electric power only to a minimum number of components that absolutely require electric power to save energy. The components that absolutely require electric power are the register 124 employed in the controller 120, the register 133 employed in the link layer 130, and the oscillation circuit 146, the timer 147, the controller 148 and the register 149 employed in the physical layer 140 which are shown in FIG. 8.

By employing an onboard information bus line conforming to standards known as the IEEE1394 in the system implemented by the embodiment, electric power can be supplied through the bus line as shown in FIG. 4 from a piece of equipment in the vehicle to a piece of information handling equipment no t connected to the battery power supply as shown i n FIG. 3. Further by supplying electric power to the portable telephone 51 from the portable-telephone connection unit 50, the portable telephone 51 is capable of operating without a battery embedded in the telephone 51.

In the embodiment described above, the controller 20, the CD changer 30, the navigation unit 40, the portable-telephone connection unit 50, the television tuner 60 and the amplifier 70 are connected to the onboard information bus line B. It should be noted, however, that the apparatus is not limited to such an embodiment. That is to say, other kinds of information handling equipment can also be connected to the onboard information bus line B. For example, an FM radio, a CD player and an MD player can also certainly be connected to the onboard information bus line B. In addition, by setting such an onboard information bus line B in any movable body other than an automobile, various kinds of mounted on the movable body can be connected to each other, allowing the present invention to be applied thereto.

In addition, a bus line conforming to standards known as the IEEE1394 is employed in the embodiment as described above. It is worth noting, however, that a system can also be built by using a bus line conforming to other standards such as a bus line for implementing connection electrically or a bus line implemented by optical fibers. Furthermore, the embodiment implements a system installed in an automobile. It is needless to say, however, that the embodiment can also implement an information processing system installed in a movable body other than an automobile.

What is claimed is:

1. An onboard information processing apparatus comprising a plurality of pieces of onboard information handling equipment installed in a vehicle wherein:

each of said pieces of onboard information handling equipment has a connection unit for connection with a bus line of a predetermined format;

said connection units of said pieces of onboard information handling equipment have a controller, a link layer and a physical layer and are connected to each other by said bus line; and when a piece of onboard information handling equipment is not used, said connection unit of said piece of onboard information handling equipment is put in a sleep mode, providing electric power only to a minimum number of components requiring electric power.

2. An onboard information processing apparatus according to claim 1 wherein said connection unit ends said sleep mode, transiting to a standby mode after a predetermined period of time has lapsed since the start of said sleep mode.

3. An onboard information processing apparatus according to claim 2 wherein said connection unit transits back to said sleep mode if neither data is transferred nor operation is carried out during a predetermined period of time following said transition to said standby mode.

4. An onboard information processing apparatus according to claim 1 wherein components receiving electric power in a sleep mode of a connection unit include a state saving means for saving states of said connection unit prior to said sleep mode and a clock means for measuring a predetermined period of time.

5. An automobile having a plurality of pieces of onboard information handling equipment installed therein wherein:

each of said pieces of onboard information handling equipment has a connection unit for connection with a bus line of a predetermined format;

said connection units of said pieces of onboard information handling equipment have a controller, a link layer and a physical layer and are connected to each other by said bus line; and when a piece of onboard information handling equipment is not used, said connection unit of said piece of onboard information handling equipment is put in a sleep mode, providing electric power only to a minimum number of components requiring electric power.

* * * * *